(12) United States Patent
Espinosa-Sanchez et al.

(10) Patent No.: US 10,994,861 B2
(45) Date of Patent: May 4, 2021

(54) REFUELING SYSTEM

(71) Applicant: Airbus Defence and Space SAU, Getafe (ES)

(72) Inventors: Martin Espinosa-Sanchez, Getafe (ES); Javier Valedeolmos Traba, Getafe (ES)

(73) Assignee: AIRBUS DEFENCE AND SPACE SAU, Getafe (ES)

( * ) Notice: Subject to any disclaimer, the term of this patent is extended or adjusted under 35 U.S.C. 154(b) by 121 days.

(21) Appl. No.: 16/204,450

(22) Filed: Nov. 29, 2018

(65) Prior Publication Data

US 2019/0161201 A1 May 30, 2019

(30) Foreign Application Priority Data

Nov. 29, 2017 (EP) .................................... 17382806

(51) Int. Cl.
*B64D 39/02* (2006.01)
*B65H 54/28* (2006.01)
*B65H 75/44* (2006.01)

(52) U.S. Cl.
CPC .......... *B64D 39/02* (2013.01); *B65H 54/2854* (2013.01); *B65H 75/4407* (2013.01); *B65H 75/4415* (2013.01); *B65H 75/4478* (2013.01); *B65H 75/4484* (2013.01); *B65H 2701/33* (2013.01)

(58) Field of Classification Search
CPC ............ B65H 75/4407; B65H 75/4484; B65H 75/4415; B65H 54/2854; B65H 75/4478; B65H 2701/33; B64D 39/02
See application file for complete search history.

(56) References Cited

U.S. PATENT DOCUMENTS

| 2,954,190 A | | 9/1960 | Le Clair | |
|---|---|---|---|---|
| 3,861,505 A | * | 1/1975 | Sugimura | B65H 75/425 191/12.2 R |
| 4,235,394 A | * | 11/1980 | Fry | B65H 54/2854 242/397.3 |
| 4,655,399 A | * | 4/1987 | Harvey | A01G 25/095 137/355.21 |

(Continued)

FOREIGN PATENT DOCUMENTS

GB 2219787 A 12/1989

OTHER PUBLICATIONS

European Search Report; priority document.

*Primary Examiner* — William A. Rivera
(74) *Attorney, Agent, or Firm* — Greer, Burns & Crain, Ltd.

(57) ABSTRACT

A refueling system, comprising a drum rotatable to wind and unwind a hose, a carriage guiding the hose and lineally displaceable along a shaft parallel to the longitudinal direction of the drum so as to follow the movement of the hose along the drum. The shaft allows the displacement of the carriage along its length. A motor is coupled to the carriage and displaces the carriage along the shaft. A first position sensor communicates with the carriage to obtain its position. A second position sensor communicates with the drum to obtain the position of the hose. A control system is coupled to the first and the second sensor, to compare their obtained positions and to operate the motor.

5 Claims, 1 Drawing Sheet

(56) References Cited

U.S. PATENT DOCUMENTS

| | | | | |
|---|---|---|---|---|
| 5,564,637 | A * | 10/1996 | Berthold | B65H 54/2803 242/157.1 |
| 6,443,431 | B1 * | 9/2002 | Stasny | B66D 1/38 242/157.1 |
| 6,811,112 | B1 * | 11/2004 | Currie | B65H 54/2872 242/157.1 |
| 7,370,823 | B2 * | 5/2008 | Lammermann | B65H 54/2878 242/397.2 |
| 8,141,260 | B2 * | 3/2012 | Pellen | G01B 11/26 33/366.24 |
| 9,809,416 | B1 * | 11/2017 | Spruell | B65H 63/08 |
| 10,011,456 | B2 * | 7/2018 | Affaticati | B65H 63/06 |
| 10,202,264 | B2 * | 2/2019 | Moll | B66D 1/28 |
| 2016/0199889 | A1 | 7/2016 | Larsen | |

* cited by examiner

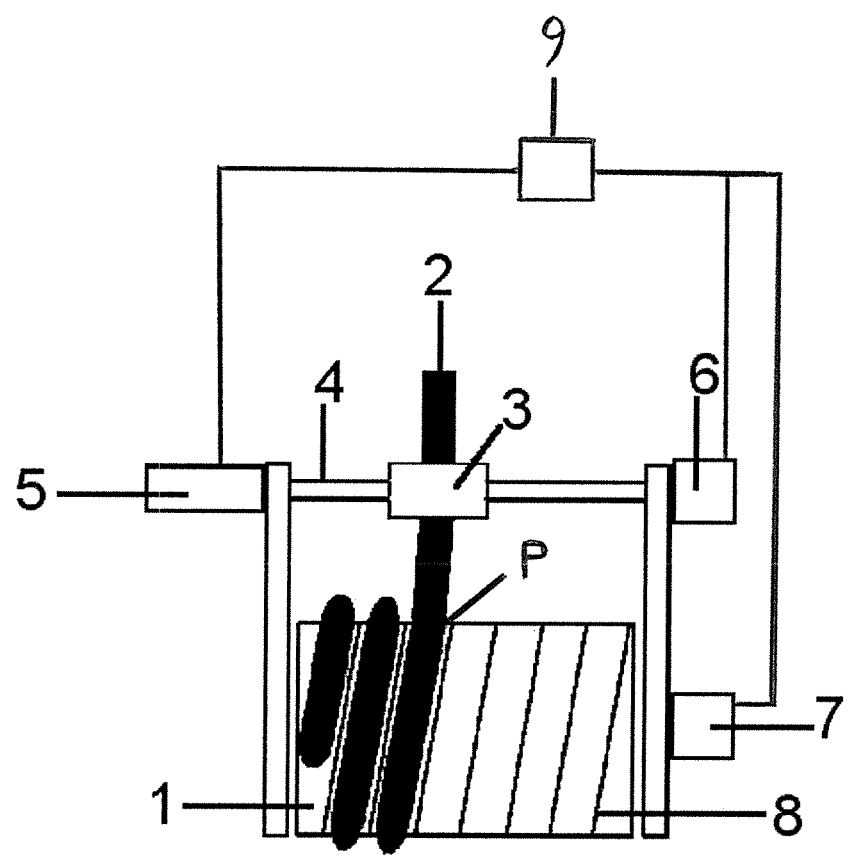

REFUELING SYSTEM

CROSS-REFERENCES TO RELATED APPLICATIONS

This application claims the benefit of the European patent application No. 17382806.2 filed on Nov. 29, 2017, the entire disclosures of which are incorporated herein by way of reference.

FIELD OF THE INVENTION

The invention is related to a refueling system configured for hose wind and unwind and for its lateral guidance. The invention could be applied to air to air refueling (AAR) operations when a hose and drogue system is employed.

BACKGROUND OF THE INVENTION

Hose and drogue refueling systems consist of a drum for winding/unwinding the hose during the system operation. Typically, several layers are required to wrap the hose in the drum. Due to the internal construction of the hose, which provides high rigidity, an auxiliary system is required to laterally guide the hose for a proper winding/unwinding in the drum. This system is called a service carriage.

The service carriage system is typically geared to the drum and the movement of both is synchronized by a series of gears. The service carriage follows the hose movement with a linear displacement, changing direction at the end of each hose layer by an Archimedean shaft.

Therefore, the known hose and drogue refueling system comprises:

a drum configured to rotate in a first direction to wind a hose and in a second direction to unwind the hose, a carriage, called a service carriage, configured to guide the hose as the hose is wound and unwound, the carriage lineally displaceable along a shaft parallel to the longitudinal direction of the drum so as to follow the movement of the hose along the drum, and the mentioned shaft that is configured to allow the displacement of the carriage along its length.

The movement between the drum and the service carriage is fixed and could not be changed between hose layers. A compromise is required during the design process in order to achieve a proper wrap of the different layers.

This compromise causes a not perfect winding between layers. This can induce wear on the hose, a less optimal use of the drum and additional mechanical redesign to adapt the system to alternative configurations (for example, change of hose diameter).

The mechanical system forces a synchronization between the drum and service carriage movements. This system does not allow changing the movement logic between each layer or stop the movement of the service carriage.

SUMMARY OF THE INVENTION

A service carriage object of the invention further comprises:

a motor coupled to the carriage and configure to displace the carriage along the shaft, a first position sensor configured to be communicated with the carriage to obtain its position along the shaft, a second position sensor configure to be communicated with the drum to obtain the position of the hose along the drum, and a control system configured to be coupled to the first and the second sensor, to compare their obtained positions and to operate the motor to move the carriage so as to synchronize its displacement with the position of the hose in the drum, according to the required logic.

Therefore, a refueling system object of the invention is able to mechanically decouple the movement of the carriage and the drum and to synchronize their positions. To achieve this, a motor is configured to move the carriage and a control system synchronizes the movement of both elements, i.e., the drum and the carriage because both position sensors determine the respective carriage and drum positions.

The claimed invention allows the movement of the carriage to be independent of the movement of the drum. This allows, among other possibilities, to change the linear speed of the carriage, to modify the position between the extension and retraction maneuver or between different layers of the drum or to stop the movement when necessary.

This flexibility allows improving the winding/unwinding of the hose, to reduce the power required during the operation and to reduce the wear of the hose by avoiding friction between the different turns of the hose. On the other hand, also allows adapting the system to different hose diameters and lengths, without a mechanical modification of the system.

BRIEF DESCRIPTION OF THE DRAWINGS

To complete the description and in order to provide for a better understanding of the invention, a drawing is provided. The drawing forms an integral part of the description and illustrate a preferred embodiment of the invention. The drawing comprises the following FIGURE.

The FIGURE shows a schematic side view of an embodiment of the refueling system object of the invention.

DETAILED DESCRIPTION OF THE PREFERRED EMBODIMENTS

The FIGURE shows an embodiment of the invention in which the drum (1) is configured to rotate in a first direction to wind a hose (2) and in a second direction to unwind the hose (2). The disclosed drum (1) is a rotatable drum (1) with a helical groove (8) to accommodate the hose (2).

The carriage (3) is configured to guide the hose (2) as the hose (2) is wound and unwound and is lineally displaceable along the shaft (4) parallel to the longitudinal direction of the drum (1) so as to follow the movement of the hose (2) longitudinally along the drum (1).

More specifically, the shaft (4) is a worm gear and therefore the carriage (3) is movable longitudinally along the worm gear by means of a threaded connection therewith. In this embodiment, the motor (5) is connected to the shaft (4), i.e., to the worm gear, for its rotation and the carriage (3) is therefore displaceable along the thread of the worm gear. Specifically, the motor (5) may be an electrical motor.

The shown embodiment also includes the first position sensor (6) configured to be in communication with the carriage (3) to obtain the longitudinal position of the carriage along the shaft (4) and the second position sensor (7) configured to be in communication with the drum (1) to obtain the position of a portion of the hose (2) at a point (P) of winding engagement longitudinally along the drum (1).

According to the above, a control system (9) is configured to be coupled to the first (6) and the second (7) sensor. The control system is configured to compare the obtained positions of the carriage (3) and the point (P) of winding engagement of the hose and to operate the motor (5) to move the shaft (4) and hence the carriage (3) so as to synchronize longitudinal displacement of the carriage with the winding engagement point (P) position of the hose (2) longitudinally on the drum (1), according to the requested synchronizing law.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A refueling system, comprising:
   a drum configured to rotate in a first direction to wind a hose and in a second direction to unwind the hose, wherein the drum comprises a helical groove to accommodate the hose,
   a carriage configured to guide the hose as the hose is wound and unwound, the carriage being lineally displaceable along a shaft parallel to a longitudinal direction of the drum so as to follow a movement of the hose along the drum,
   the shaft configured to allow the displacement of the carriage along its length,
   a motor coupled to the carriage and configured to displace the carriage along the shaft,
   a first position sensor configured to communicate with the carriage to obtain a position of the carriage along the shaft,
   a second position sensor configured to communicate with the drum to obtain a position of the hose along the drum, and
   a control system configured to be coupled to the first position sensor and the second position sensor, to compare their obtained positions and to operate the motor to move the carriage so as to synchronize a displacement of the carriage with the position of the hose on the drum.

2. The refueling system, according to claim 1, wherein the carriage and the drum are mechanically decoupled.

3. The refueling system, according to claim 1, wherein the shaft comprises a worm gear.

4. The refueling system, according to claim 1, wherein the motor is an electrical motor.

5. The refueling system, according to claim 1, wherein the second position sensor is configured to obtain a position of the hose at a point of unwinding engagement longitudinally along the drum.

* * * * *